US009712324B2

(12) United States Patent  (10) Patent No.: US 9,712,324 B2
Neumann et al.  (45) Date of Patent: Jul. 18, 2017

(54) METHODS AND APPARATUSES FOR REDUCING OR ELIMINATING UNAUTHORIZED ACCESS TO TETHERED DATA

(71) Applicant: Forcepoint Federal LLC, Herndon, VA (US)

(72) Inventors: Matthew D. Neumann, Dallas, TX (US); Michael W. Smith, Murphy, TX (US)

(73) Assignee: Forcepoint Federal LLC, Herndon, VA (US)

( * ) Notice: Subject to any disclaimer, the term of this patent is extended or adjusted under 35 U.S.C. 154(b) by 14 days.

(21) Appl. No.: 13/846,977

(22) Filed: Mar. 19, 2013

(65) Prior Publication Data

US 2014/0289524 A1   Sep. 25, 2014

(51) Int. Cl.
  *H04L 9/32*   (2006.01)
  *H04L 29/06*   (2006.01)
  *G06F 21/62*   (2013.01)
  *G06F 21/00*   (2013.01)

(52) U.S. Cl.
  CPC ............ *H04L 9/3244* (2013.01); *G06F 21/62* (2013.01); *H04L 63/107* (2013.01); *H04L 63/0428* (2013.01)

(58) Field of Classification Search
  CPC ................ G06F 21/62; G06F 21/6209; G06F 2221/2107; G06F 2221/2115; G06F 2221/2151; G06F 21/575; G06F 21/606; H04L 63/107; H04L 9/3244; H04L 9/00;
  (Continued)

(56) References Cited

U.S. PATENT DOCUMENTS

| 5,265,159 A | 11/1993 | Kung |
| 6,772,340 B1 | 8/2004 | Peinado et al. |
| 6,985,588 B1 * | 1/2006 | Glick et al. .................. 380/258 |

(Continued)

FOREIGN PATENT DOCUMENTS

| WO | WO-2014/153312 A1 | 9/2014 |
| WO | WO-2014/153315 A2 | 9/2014 |

OTHER PUBLICATIONS

"International Application Serial No. PCT/US2014/030958, International Search Report mailed Aug. 27, 2014", 4 pgs.

(Continued)

*Primary Examiner* — Gary Gracia
(74) *Attorney, Agent, or Firm* — Schwegman Lundberg & Woessner, P.A.

(57) ABSTRACT

Embodiments of a method and apparatus for reducing or eliminating unauthorized access to secured files are generally described herein. In some embodiments, the method includes establishing a connection between a communication portion of the secured file and an authentication agent. The method may include requesting a decryption key from the authentication agent for accessing the secured file on a first computing device. The decryption key may be based on device information retrieved from devices in an authenticated environment of devices. The authenticated environment may be an environment in which the secured the was encrypted. The method may include destroying the secured file subsequent to receiving a message indicating that the requesting has failed.

16 Claims, 5 Drawing Sheets

(58) Field of Classification Search
CPC ... H04L 9/0813; H04L 9/0866; H04L 9/3226; H04L 9/3247
USPC .................................................. 713/170, 171
See application file for complete search history.

(56) References Cited

U.S. PATENT DOCUMENTS

| | | | |
|---|---|---|---|
| 7,146,340 B1 | 12/2006 | Musson | |
| 7,177,426 B1* | 2/2007 | Dube | G06F 21/6209 380/262 |
| 7,324,974 B1 | 1/2008 | Cho et al. | |
| 7,535,586 B2 | 5/2009 | Kumashio | |
| 8,196,029 B1 | 6/2012 | Rucker et al. | |
| 8,621,214 B2* | 12/2013 | Johnson et al. | 713/168 |
| 8,689,015 B2 | 4/2014 | Jeffries et al. | |
| 8,788,816 B1 | 7/2014 | Spaulding et al. | |
| 2002/0095589 A1* | 7/2002 | Keech | G06F 21/6209 713/189 |
| 2002/0194470 A1* | 12/2002 | Grupe | 713/153 |
| 2003/0120684 A1 | 6/2003 | Zuili | |
| 2004/0003091 A1 | 1/2004 | Coulthard et al. | |
| 2004/0128376 A1 | 7/2004 | Matsune et al. | |
| 2004/0177273 A1* | 9/2004 | Ghaffar | H04L 63/10 726/30 |
| 2005/0063542 A1 | 3/2005 | Ryu | |
| 2005/0076214 A1* | 4/2005 | Thomas et al. | 713/170 |
| 2005/0114672 A1 | 5/2005 | Duncan et al. | |
| 2005/0118987 A1* | 6/2005 | Isozaki | G06F 21/10 455/412.1 |
| 2005/0120246 A1* | 6/2005 | Jang | H04L 12/2807 726/4 |
| 2005/0204130 A1* | 9/2005 | Harris | G06F 21/10 713/165 |
| 2007/0005974 A1 | 1/2007 | Kudou | |
| 2007/0058550 A1 | 3/2007 | Nogawa | |
| 2007/0294645 A1 | 12/2007 | Medvinsky et al. | |
| 2008/0005024 A1* | 1/2008 | Kirkwood | G06Q 10/00 705/50 |
| 2008/0133494 A1 | 6/2008 | Won-kyoung et al. | |
| 2008/0228827 A1* | 9/2008 | Perlman | 707/200 |
| 2008/0250251 A1* | 10/2008 | Lin et al. | 713/189 |
| 2008/0253562 A1 | 10/2008 | Nyberg | |
| 2008/0267407 A1* | 10/2008 | Vanderveen | H04L 9/083 380/277 |
| 2008/0279384 A1* | 11/2008 | Ushiyama | 380/277 |
| 2009/0067624 A1 | 3/2009 | Cobelo et al. | |
| 2009/0097641 A1* | 4/2009 | Matsuzaki | H04L 9/30 380/44 |
| 2009/0193258 A1 | 7/2009 | Newman | |
| 2009/0249492 A1 | 10/2009 | Boesgaard Sorensen | |
| 2009/0292930 A1* | 11/2009 | Marano | G06F 21/6218 713/189 |
| 2009/0307249 A1 | 12/2009 | Koifman et al. | |
| 2009/0307496 A1 | 12/2009 | Hahn et al. | |
| 2009/0313702 A1 | 12/2009 | Mandava | |
| 2009/0319529 A1 | 12/2009 | Bartlett et al. | |
| 2010/0005296 A1* | 1/2010 | Headley | 713/168 |
| 2010/0031349 A1 | 2/2010 | Bingham | |
| 2010/0146269 A1 | 6/2010 | Baskaran | |
| 2010/0205648 A1 | 8/2010 | Saadat et al. | |
| 2010/0217977 A1* | 8/2010 | Goodwill et al. | 713/167 |
| 2010/0229069 A1* | 9/2010 | Yamaguchi et al. | 714/752 |
| 2010/0266132 A1* | 10/2010 | Bablani et al. | 380/286 |
| 2010/0318633 A1 | 12/2010 | Abzarian et al. | |
| 2010/0325423 A1 | 12/2010 | Etchegoyen | |
| 2011/0055593 A1* | 3/2011 | Lurey | G06F 21/31 713/193 |
| 2011/0235799 A1 | 9/2011 | Sovio et al. | |
| 2011/0296172 A1* | 12/2011 | Fu | H04L 9/0825 713/156 |
| 2012/0036569 A1* | 2/2012 | Cottrell et al. | 726/7 |
| 2012/0084544 A1 | 4/2012 | Farina et al. | |
| 2012/0144195 A1 | 6/2012 | Nair et al. | |
| 2012/0167164 A1 | 6/2012 | Burgess et al. | |
| 2012/0210126 A1 | 8/2012 | Johnson et al. | |
| 2012/0221865 A1* | 8/2012 | Hahn et al. | 713/193 |
| 2012/0290556 A1 | 11/2012 | Acosta-cazaubon | |
| 2013/0145171 A1* | 6/2013 | Hsien | G06F 21/575 713/184 |
| 2013/0145178 A1* | 6/2013 | Jeffries | G06F 21/6209 713/193 |
| 2013/0227692 A1* | 8/2013 | Pavlyushchik | 726/24 |
| 2013/0291056 A1 | 10/2013 | Gaudet et al. | |
| 2013/0332723 A1 | 12/2013 | Tan et al. | |
| 2014/0032924 A1* | 1/2014 | Durham et al. | 713/186 |
| 2014/0040422 A1 | 2/2014 | Jaggi | |
| 2014/0068256 A1 | 3/2014 | Sima | |
| 2014/0082717 A1 | 3/2014 | Kang et al. | |
| 2014/0122544 A1* | 5/2014 | Tran | G06F 21/10 707/825 |
| 2014/0122866 A1* | 5/2014 | Haeger | H04L 63/061 713/153 |
| 2014/0136835 A1 | 5/2014 | Sharpe | |
| 2014/0164772 A1* | 6/2014 | Forte et al. | 713/171 |
| 2014/0274037 A1 | 9/2014 | Ganu et al. | |
| 2014/0289517 A1 | 9/2014 | Neumann et al. | |

OTHER PUBLICATIONS

"International Application Serial No. PCT/US2014/030958, Written Opinion mailed Aug. 27, 2014", 6 pgs.
"International Application Serial No. PCT/US2014/030961, International Search Report mailed Oct. 10, 2014", 3 pgs.
"International Application Serial No. PCT/US2014/030961, Written Opinion mailed Oct. 10, 2014", 5 pgs.
Menezes, A., et al., "Chapter 13: Key Management Techniques", Handbook of Applied Cryptography, CRC Press, Boca Raton, FL, [online] [retrieved on Aug. 20, 2014]. Retrieved from the Internet: <URL: http ://www.cacr.math.uwaterloo.ca/hac/>, (1997), 543-590.
Zonenberg, Andrew, "Distributed Hash Cracker: A Cross-Platform GPU-Accelerated Password Recovery System", [online]. [retrieved on Jul. 1, 2013]. Retrieved from the Internet: <URL: http://web.archive.org/web/20130701000000*/http://www.cs.rpi.edu/~zonena/papers/cracker.pdf>, (Apr. 28, 2009), 1-6.
"International Application Serial No. PCT/US2014/030961, International Preliminary Report on Patentability mailed Oct. 1, 2015", 7 pgs.
"U.S. Appl. No. 13/846,974, Examiner Interview Summary mailed Nov. 17, 2016", 4 pgs.
"U.S. Appl. No. 13/846,974, Final Office Action mailed Dec. 22, 2016", 25 pgs.
"U.S. Appl. No. 13/846,974, Advisory Action mailed May 8, 2015", 3 pgs.
"U.S. Appl. No. 13/846,974, Examiner Interview Summary mailed Apr. 7, 2015", 3 pgs.
"U.S. Appl. No. 13/846,974, Examiner Interview Summary mailed Apr. 14, 2016", 4 pgs.
"U.S. Appl. No. 13/846,974, Final Office Action mailed Mar. 4, 2015", 24 pgs
"U.S. Appl. No. 13/846,974, Final Office Action mailed Dec. 16, 2015", 24 pgs.
"U.S. Appl. No. 13/846,974, Non Final Office Action mailed Jun. 27, 2016", 28 pgs.
"U.S. Appl. No. 13/846,974, Non Final Office Action mailed Jul. 7, 2015", 20 pgs.
"U.S. Appl. No. 13/846,974, Non Final Office Action mailed Aug. 29, 2014", 21 pgs.
"U.S. Appl. No. 13/846,974, Response filed Jan. 29, 2015 to Non Final Office Action mailed Aug. 29, 2014", 11 pgs.
"U.S. Appl. No. 13/846,974, Response filed Apr. 30, 2015 to Final Office Action mailed Mar. 4, 2014", 11 pgs.
"U.S. Appl. No. 13/846,974, Response filed Nov. 10, 2016 to Non-Final Office Action mailed Jun. 27, 2016", 10 pgs.
"U.S. Appl. No. 13/846,974, Response filed May 24, 2016 to Final Office Action mailed Dec. 16, 2015", 11 pgs.
"U.S. Appl. No. 13/846,974, Response filed Nov. 5, 2015 to Non-Final Office Action mailed Jul. 7, 2015", 10 pgs.
"International Application Serial No. PCT/US2014/030958, Inter- (56) References Cited

OTHER PUBLICATIONS national Preliminary Report on Patentability mailed Oct. 1, 2015", 7 pgs.
"U.S. Appl. No. 13/846,974, Examiner Interview Summary mailed Feb. 3, 2017", 4 pgs.
"U.S. Appl. No. 13/846,974, Notice of Allowance mailed Mar. 6, 2017", 16 pgs.
"U.S. Appl. No. 13/846,974, Response filed Feb. 20, 2017 to Final Office Action mailed Dec. 22, 2016", 12 pgs.
Chang, Yue, et al., "Metadata Miner Assisted Integrated Information Retrieval for Argo Ocean Data", International Conference on Systems, Man and Cybernetics, IEEE, (Oct. 11-14, 2009), 2930-2935.
Ghobadi, Alireza, et al "An Adaptive Wrapper Algorithm for File Transfer Applications to Support Optimal Large File Transfers", 11th International Conference on Advanced Communication Technology, IEEE, (Feb. 15-18, 2009), 315-320.
Wilkinson, J H, et al., "Wrapper Files—The Key to Network Technology", International Broadcasting Convention, (Sep. 12-16, 1997), 374-379.

\* cited by examiner

METHODS AND APPARATUSES FOR REDUCING OR ELIMINATING UNAUTHORIZED ACCESS TO TETHERED DATA

TECHNICAL FIELD

Some embodiments relate to file security. Some embodiments relate verifying that machines requesting access to sensitive files are in an authenticated environment.

BACKGROUND

Corporations and government entities may seek to reduce or eliminate instances of unauthorized access to various types of sensitive information. Some systems may encrypt sensitive files. However, as the speed and power of computers increases, adversaries can use brute-force methods to decrypt encrypted files. Other systems may destroy encrypted files or file passwords after a period of time. However, these systems do not prevent a brute-force attack on encrypted data.

Thus, there are general needs for systems and methods for tethering data to a trusted environment by destroying data upon that data leaving its trusted environment, and for preventing brute-force attacks on encrypted data.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Current corporate and governmental file security systems may seek to ensure the confidentiality of data by encrypting data using encryption keys. However, as the speed and power of computers increases, adversaries become increasingly quicker at brute-forcing the encryption keys and gaining access to sensitive data.

Some systems may render data unreadable after a user-specified amount of time. However, these systems do not prevent a brute-force attack on the data itself. For example, unless the user-specified time for self-destruction is very short, on the order of hours or days, an adversary with a powerful computer or network of computers could still gain brute-force access to the data.

Example embodiments may tether data by allowing the data to be accessible to users only from machines in an authenticated environment. For example, users may only be permitted access to some files when the user is within a particular network, or operating on a certain machine. If a user or entity attempts to access the tethered data from outside the authenticated environment, in at least some embodiments, the data may be destroyed. Example embodiments may further provide user authentication mechanisms before a user can attempt to access the data.

Figure 1:
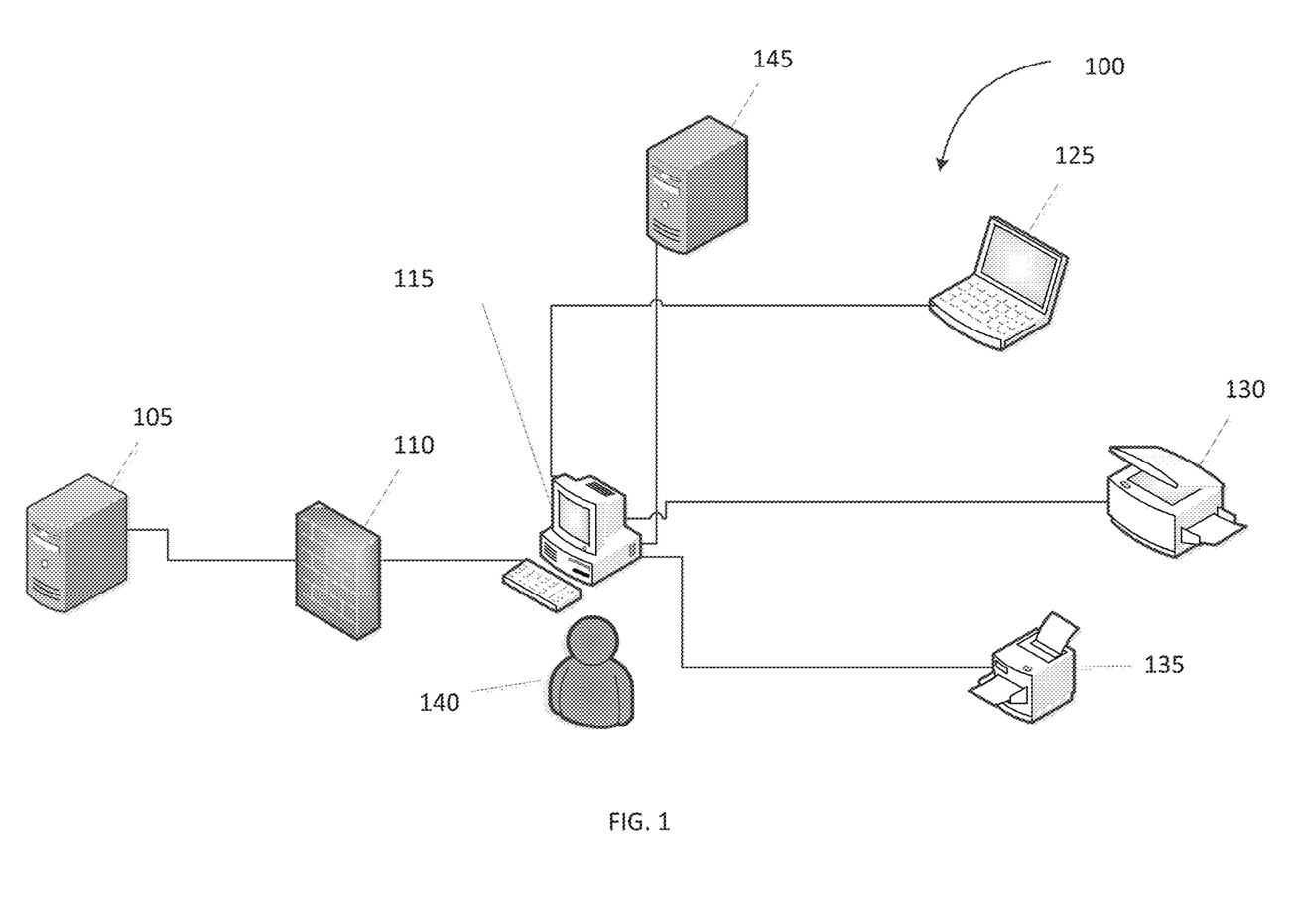
FIG. 1 is a system in accordance with some embodiments.

FIG. 1 is a system 100 in which example embodiments may be implemented. The system 100 includes a server 105 for storage of data files, including sensitive data files. A firewall 110 may be present between the server 105 and at least one user computer or device 115. Other devices 125, 130, and 135 may be in a network with the device 115. A coordination server 145 may be in the network for coordination of key segment collection as described below with respect to FIG. 2. A user 140 may wish to access a secured file using the device 115. The device 115 may implement a procedure 200 as discussed below with respect to FIG. 2, to reduce or eliminate occurrences of unauthorized access to the secured file.

Figure 2:
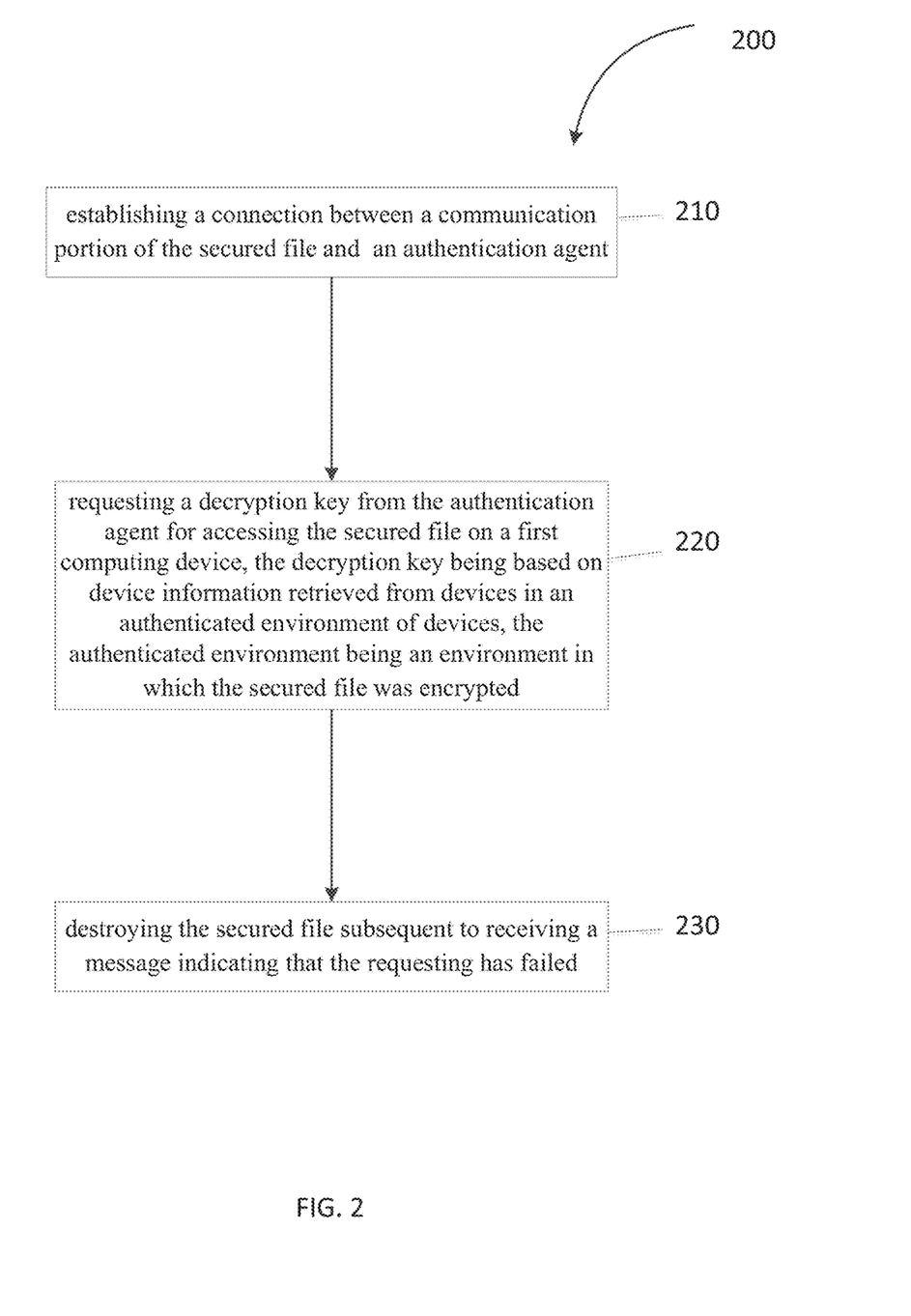
FIG. 2 is a procedure for reducing or eliminating unauthorized access to a secured file in accordance with some embodiments.

FIG. 2 is a procedure 200 for reducing or eliminating unauthorized access to a secured file.

In operation 210, the device 115 may establish a connection between a communication portion of the secured file and an authentication agent.

In operation 220, the device 115 may use the communication portion of the secured file to request a decryption key from the authentication agent for accessing encrypted data of the secured file on the device 115. The decryption key may be based on environment information, for example device information, retrieved from devices in an authenticated environment of devices. The environment may be, for example, the cloud. The authenticated environment may be an environment in which the secured file was encrypted. For example, the authenticated environment may include the devices 115, 125, 130 and 135.

The device 115 may further obtain a value of an indicator within a non-encrypted portion of the secured file. The value may indicate whether the secured file was saved locally on the device 115. The device 115 may query the authentication agent for a local decryption key or a remote decryption key based on the value. The device 115 may be, for example, a computer, router, switch, or other network element. A local decryption key may be based on identification information of the device 115. A remote decryption key may be based on information of a second computing device, such as for example a computer, router, switch or other network element in the authenticated environment. The second computing device may be, for example, device 125, 130, or 135.

In operation 230, the device 115 may use the communication portion to destroy the secured file upon receiving a message that the request for the decryption key has failed.

In some embodiments, the message may indicate that communication with the authentication agent has failed. Communication with the authentication agent may fail, for example, when there is no authentication agent on the device 115.

In some embodiments, the message may indicate that the authentication agent could not create the requested decryption key. For example, if the authentication agent determines that the device 115 is not in an authenticated environment, for example because the device 115 has left the authenticated environment, the authentication agent may report that the authentication agent is unable to create the decryption key.

The authentication agent may determine whether the device 115 is in the authenticated environment by reading hashed values stored in the secured file. The hashed values may have been stored in the secured file when the secured file was encrypted. The hashed values may represent the environment in which the data was stored. For example, the hashed values could be stored on servers, storage devices, virtual appliances, network devices, etc. Further, as an example, the hashed values may represent network locations that were present when the secured file was encrypted. These network locations may therefore represent the authenticated environment. The authentication agent may convert the hashed values into network locations or network location information through a lookup table on another machine, for example the coordination server 145 (FIG. 1), in the network. The coordination server 145 may collect or facilitate collection of key segments from the network locations for creation of the decryption key. If the coordination server 145 does not find one or more of these network locations in the environment from which access to the secured file is attempted, then the authentication agent may determine that the device 115 is not in an authenticated environment, and that the requested decryption key cannot be created. Therefore, no decryption key will be provided, and the secured data cannot be accessed from device 115, which has been determined to be outside the authenticated environment.

If the device 115 requests the local key, rather than the remote key, the key location may be a hash of system data of the device 115. In at least these embodiments, the authentication agent may check whether the system data is system data of the device 115. In at least these embodiments, the authentication agent may report that the authentication agent is unable to create the requested decryption key if the device 115 is a different machine from that at which the secured file was locally encrypted and saved. The authentication agent may determine whether the secured file was encrypted and saved locally to a machine by examining an indicator in the metadata of the secured file, for example.

Destroying the secured file may include encrypting the secured file a plurality of times using an encryption key. The encryption key may be based on data stored on the device 115. The data for creating the encryption key may not be identification information of the device 115.

The procedure 200 may further include receiving the decryption key and destroying the secured file upon determining that the decryption key is a spoofed key. The device 115 may determine that the decryption key is a spoofed key by decrypting the secured file using the decryption key and examining metadata information. If the metadata information does not match expected metadata information, the device 115 may determine that the decryption key is a spoofed key and destroy the secured file. For example, the secured file may include file-type specific metadata. If decrypting the secured file results in garbled metadata or metadata for a different file type, the device 115 may determine that the decryption key is a spoofed key.

The procedure 200 may further include querying the authentication agent for an encryption key for encrypting the secured file. The procedure 200 may include encrypting the secured file using the encryption key and saving the secured file to a remote server, saving the secured file locally to memory of the device 115, or saving the secured file to both the remote server and the device 115 based on a value of an indicator within metadata of the secured file.

Figure 3:
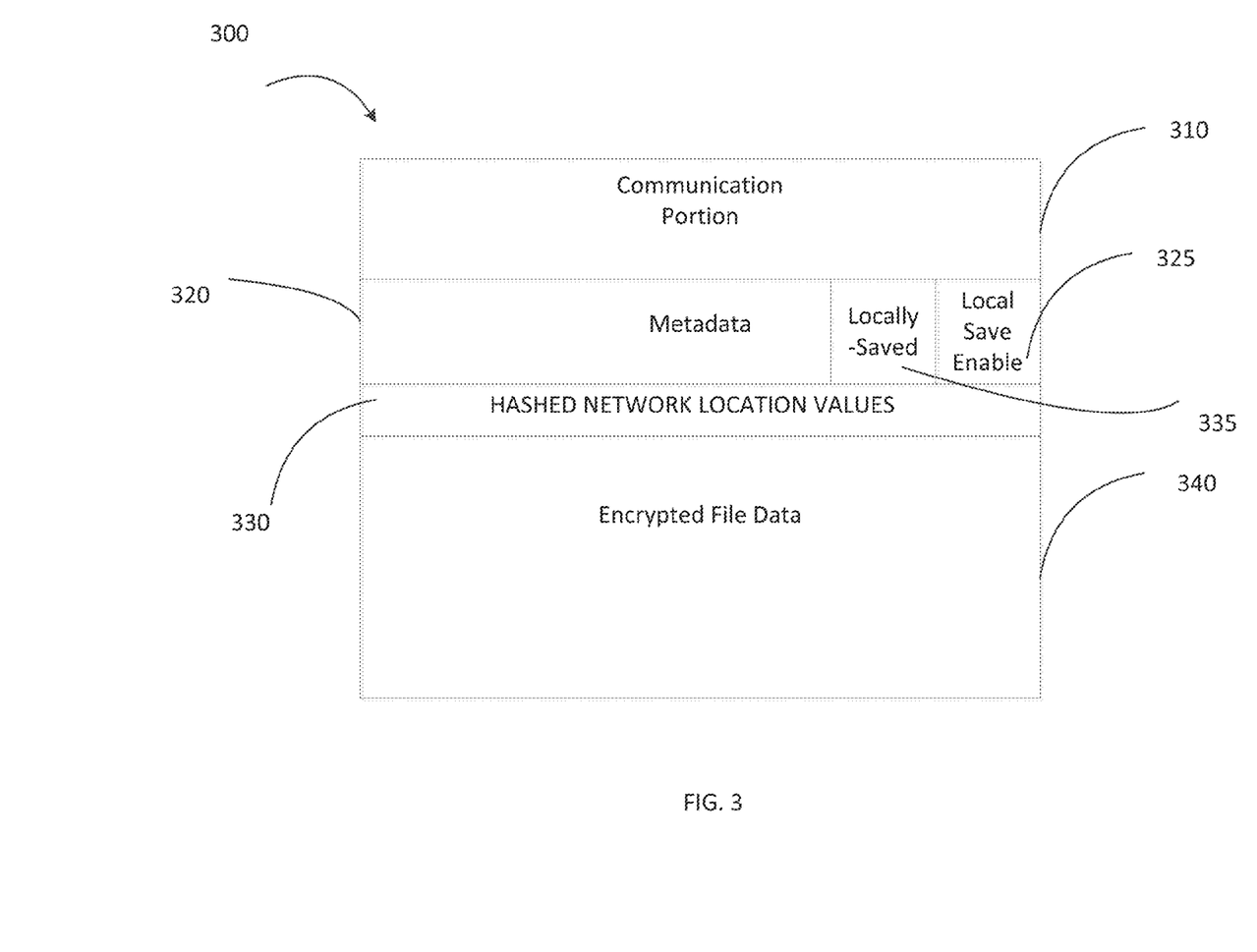
FIG. 3 is a block diagram of a secured file in accordance with some embodiments.

FIG. 3 is an illustrative example of a file 300, secured according example embodiments of the procedure 200. The example file 300 may include a communication portion 310 for communicating with an authentication agent. The example file 300 may further include metadata 320. The metadata 320 may include information for identifying a file type of the file 300. The metadata 320 may have an indicator 325, for example a local save enable flag, for indicating whether the file may be saved locally on the device 115. The metadata 320 may have another indicator 335, for example a locally-saved flag, for indicating whether the file was encrypted with a key created based on data of the local machine, such that the file may be opened on the device 115 without being connected to the authenticated environment.

The example file may further include hashed values 330 for use by the coordination server 140 (FIG. 1), authentication agent, or other system for assembling key segments of the decryption key as described above with respect to FIG. 2. The hashed values may represent the environment in which the data was stored. For example, the hashed values could be stored on servers, storage devices, virtual appliances, network devices, etc. Further, as an example, the hashed values may represent network locations that were present when the secured file was encrypted. The example file may further include encrypted file data 340 encrypted with, for example, one or more keys received from the authentication agent. The encrypted file data 340 may include data created with various editors, for example text editors, video editors, and graphics editors.

Figure 4:
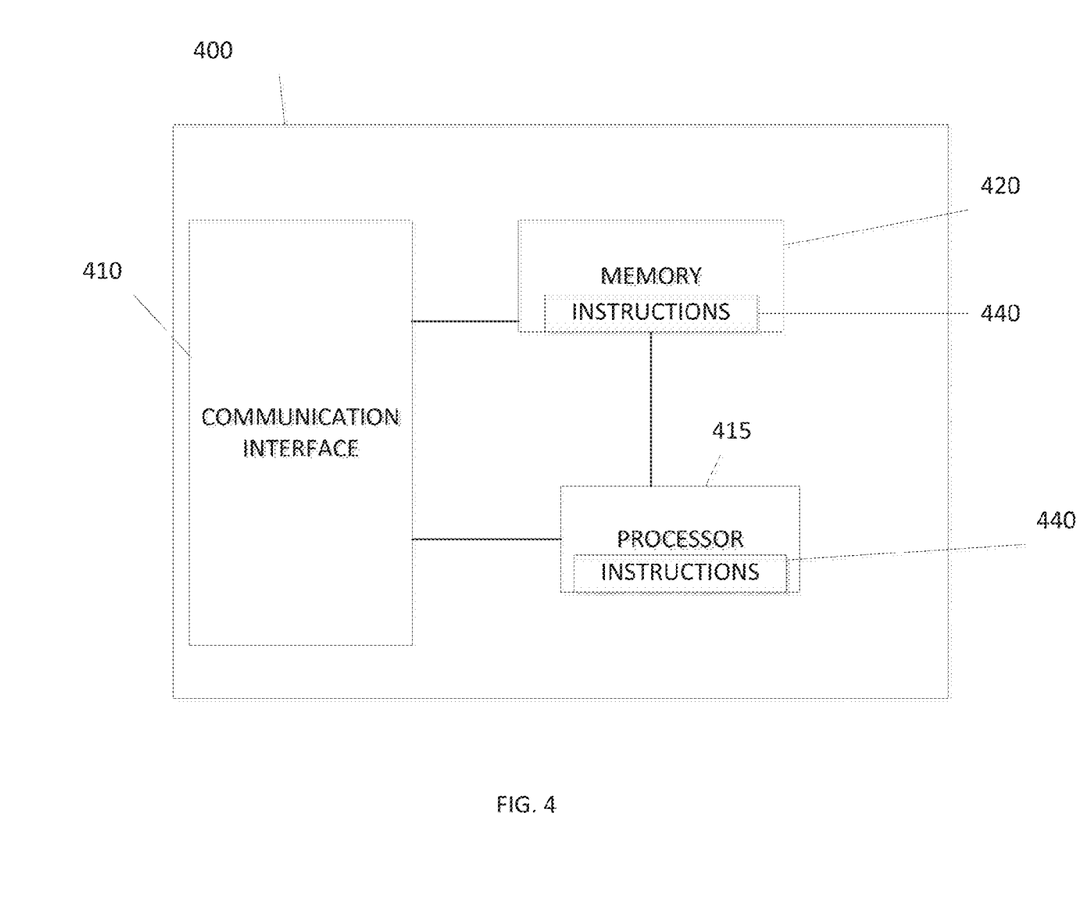
FIG. 4 is a block diagram of a computer for implementing procedures in accordance with some embodiments.

FIG. 4 is a block diagram of a computer 400 for implementing methods according to example embodiments. The computer 400 may be appropriate for performing the functionalities of the device 115 (FIG. 1). The computer 400 may be appropriate for viewing and editing files of various types.

Figure 5:
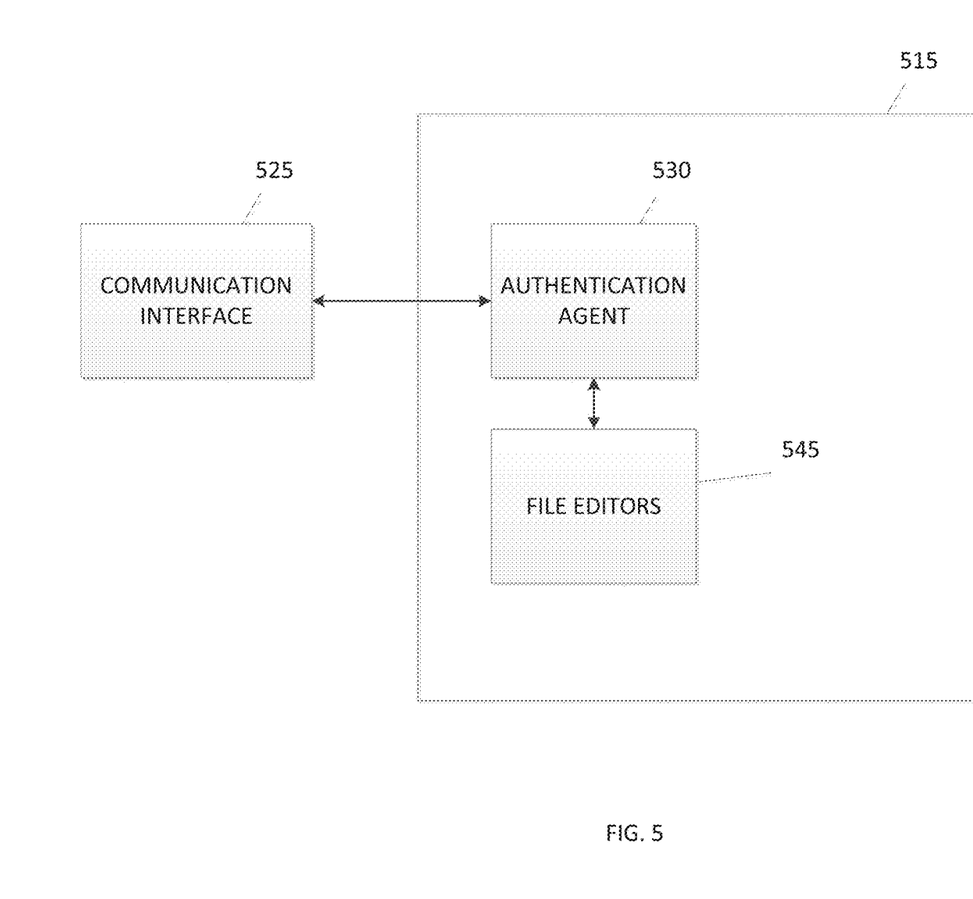
FIG. 5 is a block diagram of a processor for implementing procedures in accordance with some embodiments.

The computer 400 may include a communication interface 410. The computer 400 may include one or more processors 415. The processor 415 may include components as shown in FIG. 5. Referring to FIG. 5, the processor 515 may include an authentication agent 530 and one or more file editors 545. The authentication agent 530 may communicate with a remote file storage, for example the server 105 (FIG. 1) over the communication interface 525.

The one or more file editors 545 may be used to create a secured file as described above with respect to FIG. 3. The secured file may include a communication portion for requesting the encryption key from the authentication agent and a data portion including data encrypted with the encryption key. The data portion may be similar to the encrypted file data 330 (FIG. 3).

The authentication agent 530 may receive a request for a decryption key for decrypting the secured file. The authentication agent 530 may determine whether the request is received from within an authenticated environment. The authenticated environment may be a device on which the file was encrypted or a network of devices including the device on which the file was encrypted. The authentication agent 530 may return an error message subsequent to determining that the request is received from outside the authenticated environment.

The authentication agent may generate the decryption key based on identification information of the computer 400 or upon identification information of network locations retrieved from hashed network location values 330 in the secured file. For example, the identification information may be identification information of devices 115, 125, 130 or 135 (FIG. 1). The authentication agent may retrieve data specific to different machines in the networked environment, such as router names, computer medium access control (MAC) addresses, etc. The data obtained may be unique for each secured file. The data may be retrieved by the authentication agent through the coordination server 145 (FIG. 1).

The authentication agent 530 may further be arranged to save the secured file to the remote file storage, for example the server 105 (FIG. 1). The authentication agent 530 may be arranged to save the secured file to local file storage, for example to memory 420 (FIG. 4). The authentication agent 530 may be arranged to save the secured file to both remote file storage and local file storage, based on an indicator in the metadata of the secured file. The authentication agent 530 may be arranged to encrypt the secured file using identification information of network locations or devices 115, 125, 130, or 135. The authentication agent 530 may be arranged to write hashed values 330 (FIG. 3) representing the network locations to the secured file.

Referring again to FIG. 4, the computer 400 may store the secured file locally in a memory 420. In one embodiment, the memory 420 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data. The computer 400 may include computer instructions 440 that, when implemented on the computer 400, cause the computer 400 to implement functionality in accordance with example embodiments.

For example, the computer instructions 440 may, when executed on the computer 400, cause the computer 400 to receive a request for access to a file. The computer instructions 440 may, when executed on the computer 400, cause the computer 400 to establish a connection, through a communication portion of the file for which access is requested, to an authentication agent on the computer 400. The connection may be a transmission control protocol (TCP) socket or a universal datagram protocol (UDP) socket. The communication portion of the file may be similar to the communication portion 310 (FIG. 3).

The computer instructions, when executed on the computer 400, may cause the computer 400 to request a decryption key from the authentication agent for decrypting the file. The computer 400 may request the decryption key using the communication portion 310 of the file (FIG. 3). The decryption key may be based on device information retrieved from devices in an authenticated environment of devices. The authenticated environment of devices being an environment in which the file was encrypted. The instructions 440 may cause the computer 400 to destroy the file subsequent to determining that the request for the decryption key has failed. The destroying may include encrypting the file a plurality of times with an encryption key. The encryption key may be based on data stored on the computer 400. The data may not be identification information of the computer 400.

The instructions 440 may further cause the computer 400 to receive a notification message from the authentication agent that that the decryption key could not be created because the computer 400 has left the authenticated environment. The instructions 440 may further cause the computer 400 to destroy the file upon determining that the authentication agent is not executing on the computer 400.

The instructions 440 may cause the computer 400 to obtain a value of an indicator within a non-encrypted portion of the file. The value may indicate whether the file was saved locally on the computer 440. The instructions 440 may cause the computer 400 to query the authentication agent for a local key or a remote key based on the value. The local key may be based on identification information of the computer 400. The remote key may be based on information of a second machine in the authenticated environment. The second machine may be a different machine from the first machine.

The instructions 440 may cause the computer 400 to perform an editing operation on the file subsequent to opening the file using the local key or the remote key. The editing operation may be performed using one or more file editors 545 (FIG. 5). The instructions 440 may cause the computer 400 to save the file locally or remotely, using a second local key or a second remote key retrieved using the authentication agent, based on the value of the indicator.

The instructions 440 may be stored on a computer-readable storage device, which may be read and executed by at least one processor 415 to perform the operations described herein. In some embodiments, the instructions 440 are stored on the processor 415 or the memory 420 such that the processor 415 or the memory 420 act as computer-readable media. A computer-readable storage device may include any non-transitory mechanism for storing information in a form readable by a machine (e.g., a computer). For example, a computer-readable storage device may include ROM, RAM, magnetic disk storage media, optical storage media, flash-memory devices, and other storage devices and media.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for reducing or eliminating unauthorized access to a secured file, the method comprising:
adding a communication portion, comprised of executable code, to the secured file;
establishing a connection between the communication portion of the secured file and an authentication agent, the secured file further including an encrypted portion;
requesting a decryption key, using the communication portion, from the authentication agent for accessing the secured file on a first computing device, the decryption key being based on identification information other than user information, the identification information being retrieved from at least a second computing device and a third computing device in an authenticated environment of devices including the first computing device, the authenticated environment being an environment in which the secured file was encrypted;
determining, by the authentication agent, whether the first computing device is in the authenticated environment by reading a plurality of hash values of the secured file, the hash values represent the environment in which the secured file was created;
converting the hash values to network locations within the authentication environment;
retrieving key segments from the network locations including the second and third computing devices;
determining the first computing device is not in the authenticated environment in response to determining a hash value of the hash values does not correspond to a location within the authenticated environment; and
destroying the secured file, using the communication portion, subsequent to receiving a message indicating that the requesting has failed, including encrypting, using the communication portion, the secured file a plurality of times with an encryption key, the encryption key being based on data stored on the first computing device.

2. The method of claim 1, wherein the message indicates that the decryption key could not be created.

3. The method of claim 2, wherein the message indicates that the decryption key could not be created because the first computing device has left the authenticated environment.

4. The method of claim 1, wherein the message indicates that communication with the authentication agent has failed.

5. The method of claim 1, wherein the requesting comprises:
obtaining a value of an indicator within a non-encrypted portion of the secured file, the value indicating whether the secured file was saved locally on the first computing device; and
querying the authentication agent for a local key or a remote key based on the value, the local key being based on identification information of the first computing device, and the remote key being based on information of the second computing device.

6. The method of claim 1, wherein the data for creating the encryption key is not identification information of the first computing device.

7. The method of claim 1, further comprising:
receiving the decryption key; and
destroying the secured file upon determining that the decryption key is a spoofed key, the determining including decrypting the secured file using the decryption key, and determining whether metadata of the decrypted secured file matches expected metadata of the decrypted secured file.

8. The method of claim 1, further comprising:
querying the authentication agent for an encryption key for encrypting the secured file; and
saving the secured file to a remote server, saving the secured file to the first computing device, or saving the secured file to both the remote server and the first computing device based on a value of an indicator within metadata of the secured file.

9. A non-transitory computer-readable medium comprising instructions that, when executed on a first machine, cause the first machine to:
receive a request for access to a file, the file being stored on the first machine, on a remote machine, or on both the first machine and the remote machine, wherein the file includes a communication portion comprised of executable code;
establish a connection, through the communication portion of the file for which access is requested, to an authentication agent on the first machine, the file further including an encrypted data portion;
request a decryption key, using the communication portion, from the authentication agent for decrypting the file, the decryption key being based on identification information retrieved from at least a second machine and a third machine in an authenticated environment of devices that includes the first machine, the authenticated environment of devices being an environment in which the file was encrypted;
determine whether the first machine is in the authenticated environment by reading a plurality of hash values of the file, the hash values represent the environment in which the file was created;
convert the hash values to respective network locations within the authentication environment;
retrieve key segments from the network locations including the second and third machines;
determine the first machine is not in the authenticated environment in response to determining a hash value of the hash values does not correspond to a location within the authenticated environment; and
destroy the file, using the communication portion, subsequent to determining that the request has failed, including encrypting, using the communication portion, the file a plurality of times with an encryption key, the encryption key being based on data stored on the first computing device.

10. The non-transitory computer-readable medium of claim 9, wherein the connection is a transmission control protocol (TCP) socket or a universal datagram protocol (UDP) socket.

11. The non-transitory computer-readable medium of claim 9, further comprising instructions that, when executed on the first machine, cause the first machine to:
receive a notification message from the authentication agent that that the decryption key could not be created because the first machine has left the authenticated environment.

12. The non-transitory computer-readable medium of claim 11, further comprising instructions that, when executed on the first machine, cause the first machine to:
destroy the file upon determining that the authentication agent is not executing on the first machine.

13. The non-transitory computer-readable medium of claim 9, further comprising instructions that, when executed on the first machine, cause the first machine to:
obtain a value of an indicator within a non-encrypted portion of the file, the value indicating whether the file was saved locally on the first machine;
query the authentication agent for a local key or a remote key based on the value, the local key being based on identification information of the first machine, and the remote key being based on information of the second machine in the authenticated environment, the second machine being a different machine from the first machine;
perform an editing operation on the file subsequent to opening the file using the local key or the remote key; and
save the file locally or remotely, using a second local key or a second remote key retrieved using the authentication agent, based on the value of the indicator.

14. An apparatus comprising:
a communication interface to communicate with a remote file storage;
an authentication agent configured to:
communicate with the remote file storage over the communication interface;
communicate with a secured file through a communication portion of the secured file, the secured file further including an encrypted portion, wherein the communication portion is comprised of executable code;
receive a request, from the communication portion, for a decryption key for accessing the secured file, the decryption key being based on identification information retrieved from at least a second device and a third device in an authenticated environment, the authenticated environment being an environment in which the secured file was encrypted, wherein the identification information includes information of other devices that are not components of the apparatus;
determine whether the apparatus is in the authenticated environment by reading a plurality of hash values of the secured file, the hash values represent the environment in which the secured file was created;

convert the hash values to respective network locations within the authentication environment;
retrieve key segments from the network locations including the second and third devices;
determine the apparatus is not in the authenticated environment in response to determining a hash value of the hash values does not correspond to a location within the authenticated environment; and
generate either the decryption key or an error message, based on whether the request is received from within the authenticated environment;
wherein the communication portion is configured to destroy the secured file subsequent to determining that the request has failed, including encrypting, using the communication portion, the secured file a plurality of times with an encryption key, the encryption key being based on data stored on the first computing device.

15. The apparatus of claim 14, further comprising a memory for local file storage of the secured file.

16. The apparatus of claim 14, further comprising:
a credentials agent to authenticate the apparatus to the remote file storage.

\* \* \* \* \*

UNITED STATES PATENT AND TRADEMARK OFFICE
CERTIFICATE OF CORRECTION

PATENT NO. : 9,712,324 B2
APPLICATION NO. : 13/846977
DATED : July 18, 2017
INVENTOR(S) : Neumann et al.

It is certified that error appears in the above-identified patent and that said Letters Patent is hereby corrected as shown below:

On the Title Page

In item (57), in "Abstract", in Column 2, Line 11, after "secured", delete "the" and insert --file-- therefor In the Specification In Column 4, Line 10, delete "140" and insert --145-- therefor

In Column 4, Line 43, delete "330" and insert --340-- therefor

In Column 5, Line 60, delete "440." and insert --400.-- therefor

In the Claims

In Column 8, Line 18, in Claim 11, delete "that that" and insert --that-- therefor Signed and Sealed this
Twenty-first Day of April, 2020

Andrei Iancu
*Director of the United States Patent and Trademark Office*